(12) United States Patent
Maruyama et al.

(10) Patent No.: US 8,215,842 B2
(45) Date of Patent: Jul. 10, 2012

(54) DYNAMIC FLUID PRESSURE BEARING, SPINDLE MOTOR, DISK DRIVE APPARATUS AND METHOD FOR MANUFACTURING THE DYNAMIC FLUID PRESSURE BEARING

(75) Inventors: Tetsuya Maruyama, Kyoto (JP); Makoto Kutsukake, Kyoto (JP); Hirofumi Kojima, Kyoto (JP); Michihiro Ito, Kyoto (JP); Masayoshi Saichi, Kyoto (JP)

(73) Assignee: Nidec Corporation, Kyoto (JP)

( * ) Notice: Subject to any disclaimer, the term of this patent is extended or adjusted under 35 U.S.C. 154(b) by 710 days.

(21) Appl. No.: 12/362,576

(22) Filed: Jan. 30, 2009

(65) Prior Publication Data
US 2009/0196540 A1      Aug. 6, 2009

(30) Foreign Application Priority Data
Jan. 31, 2008   (JP) ................. 2008-020831

(51) Int. Cl.
   *F16C 32/06*   (2006.01)
(52) U.S. Cl. ............... 384/100; 384/107; 360/99.08
(58) Field of Classification Search ............ 384/100, 384/107, 114; 360/98.07, 99.04, 99.08
   See application file for complete search history.

(56) References Cited

U.S. PATENT DOCUMENTS

| | | | |
|---|---|---|---|
| 5,366,298 A * | 11/1994 | Toshimitsu et al. | ........... 384/107 |
| 6,339,270 B1 | 1/2002 | Ichiyama | |
| 6,836,388 B2 | 12/2004 | Nishimura et al. | |
| 6,888,278 B2 | 5/2005 | Nishimura et al. | |
| 7,008,109 B2 | 3/2006 | Gomyo et al. | |
| 7,461,455 B2 | 12/2008 | Gomyo et al. | |
| 2004/0076350 A1 | 4/2004 | Gomyo et al. | |
| 2005/0225187 A1 | 10/2005 | Hafen et al. | |
| 2007/0223848 A1 * | 9/2007 | Winterhalter | ............. 384/100 |
| 2007/0236091 A1 * | 10/2007 | Fukushima | ............ 360/99.08 |

FOREIGN PATENT DOCUMENTS

| | | |
|---|---|---|
| JP | 2001-289243 A | 10/2001 |
| JP | 2002-256280 A | 9/2002 |
| JP | 2004-181396 A | 7/2004 |
| JP | 2008-215545 A | 9/2008 |

* cited by examiner

*Primary Examiner* — Gregory Binda
*Assistant Examiner* — Matthieu Setliff
(74) *Attorney, Agent, or Firm* — Keating & Bennett, LLP

(57) ABSTRACT

A fluid dynamic pressure bearing includes a shaft arranged along a central axis, an annular member fixed to the shaft, a sleeve, a lubricant, and a lubricating film. A stepped surface is provided on the outer circumferential surface of the shaft. The annular member preferably includes a lower surface extending radially with respect to the central axis and arranged to make contact with the stepped surface in the inner edge portion of the lower surface. The sleeve preferably includes an upper surface axially opposed to the lower surface of the annular member. The lubricant is provided between the shaft and the sleeve and between the annular member and the sleeve. The lubricating film is provided on the lower surface of the annular member at least over a region lying radially outwardly of the inner edge portion of the lower surface.

12 Claims, 11 Drawing Sheets

DYNAMIC FLUID PRESSURE BEARING, SPINDLE MOTOR, DISK DRIVE APPARATUS AND METHOD FOR MANUFACTURING THE DYNAMIC FLUID PRESSURE BEARING

BACKGROUND OF THE INVENTION

1. Field of the Invention

The present invention relates to a dynamic fluid pressure bearing, a spindle motor, a disk drive apparatus and a method for manufacturing the dynamic fluid pressure bearing.

2. Description of the Related Art

A hard disk apparatus for use in a personal computer, a car navigation and so forth is equipped with a spindle motor arranged to rotate a magnetic disk about the central axis thereof. The spindle motor includes a configuration in which a stator and a rotor are rotated relative to each other with a bearing device arranged therebetween. In recent years, a fluid dynamic pressure bearing device is often used as a bearing device for the spindle motor. In the fluid dynamic pressure bearing device, a lubricant exists between a shaft and a sleeve. The shaft and the sleeve are rotated relative to each other in a state that they are supported by the dynamic fluid pressure of the lubricant.

Such a conventional fluid dynamic pressure bearing and a spindle motor provided with the same are disclosed in, e.g., Japanese Patent Laid-open Publication No. 2003-88042.

A hub for supporting disks, a thrust washer and the like are fixed to a shaft of the dynamic fluid pressure bearing. These members are fixed to the outer circumferential surface of the shaft.

The axial end surface of the hub, the thrust washer or the like is opposed to the axial end surface of a sleeve through the lubricant. For that reason, it is sometimes the case that a lubricating film with enhanced lubricating property is formed on the axial end surface of the hub or the like in order to improve the slidability between the hub or the like and the sleeve and also to protect the hub or the like and the sleeve from damage possibly caused when they make contact with each other.

If the end surface of the hub or the like having the lubricating film comes into contact with the shaft during the course of fixing the hub or the like to the shaft, however, there is a possibility that the lubricating film may be damaged and hence the hub or the like may be mounted to the shaft with reduced accuracy. In other words, the lubricating film is interposed between and deformed by the shaft and the lower surface of the hub or the like. Particularly, the amount of such deformation is unevenly distributed in a circumferential direction. This may lead to a possibility that the axial position of the hub or the like relative to the shaft is mismatched and the hub or the like may be slightly inclined with respect to the shaft.

SUMMARY OF THE INVENTION

In order to overcome the problems described above, preferred embodiments of a fluid dynamic pressure bearing according to the present invention preferably include a shaft arranged along a central axis, an annular member fixed to the shaft, a sleeve, a lubricant and a lubricating film.

A stepped surface is preferably provided on the outer circumferential surface of the shaft. The annular member preferably includes a lower surface extending radially with respect to the central axis and arranged to make contact with the stepped surface in the inner edge portion of the lower surface. The sleeve preferably includes an upper surface axially opposed to the lower surface of the annular member. The lubricant preferably exists between the shaft and the sleeve and between the annular member and the sleeve.

The lubricating film is provided on the lower surface of the annular member at least over an area lying radially outwardly of the inner edge portion of the lower surface.

A method for manufacturing a fluid dynamic pressure bearing in accordance with one preferred embodiment of the present invention includes the steps a), b) and c).

In the step a), a coating is provided on at least a portion of the lower surface of the annular member.

In the step b), a lubricating film which is provided by cutting the surface of the coating and an exposed metal surface which is an exposed portion of the metal material comprising the annular member are obtained by cutting the surface of the coating.

In the step c), the annular member and the shaft are fixed together after the step b) by bringing the exposed metal surface of the annular member into contact with a stepped surface provided on an outer circumferential surface of the shaft.

Use of the method noted above makes it possible to effectively provide the lubricating film and the exposed metal surface on the lower surface of the annular member.

In the description of the present invention made herein, the terms "upper", "lower", "left" and "right" used in explaining the positional relationship and orientation of individual members are intended to designate the positional relationship and orientation in the drawings and not to designate the positional relationship and orientation when built in an actual device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. In the following description, the term "upper" refers to the side on which a rotor unit 4 lies along a central axis L and the term "lower" refers to the side on which a stator unit 3 lies along the central axis L. However, these terms are not intended to limit the installation postures of a dynamic fluid pressure bearing, a spindle motor and a disk drive apparatus of the present invention.

Figure 1:
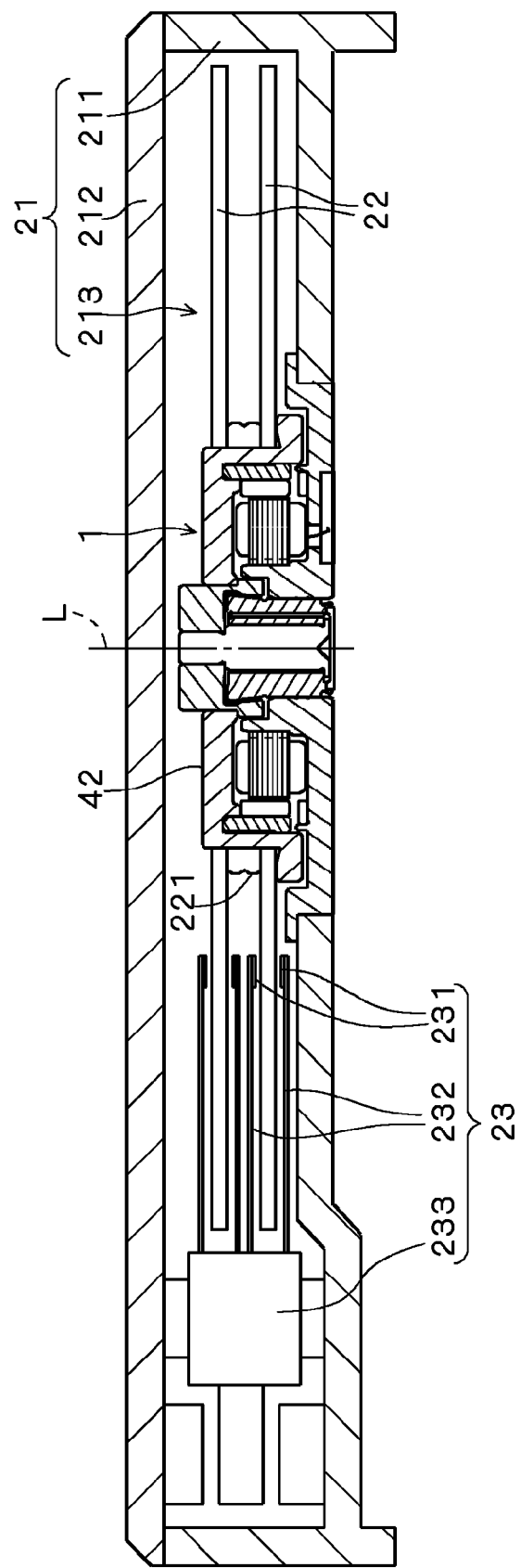
FIG. 1 is a sectional view showing a disk drive apparatus, which view is taken along a plane containing the central axis.

FIG. 1 is a sectional view showing a disk drive apparatus 2 in accordance with one preferred embodiment of the present invention, which view is taken along a plane containing the central axis. The disk drive apparatus 2 is preferably a hard disk drive which reads and writes information from and on two magnetic disks 22 while rotating the latter. As shown in FIG. 1, the disk drive apparatus 2 preferably includes an apparatus housing 21, two magnetic disks (hereinafter simply referred to as "disks") 22, an access unit 23 and a spindle motor 1.

The apparatus housing 21 preferably includes a substantially cup-shaped first housing member 211 and a second housing member 212 having a substantially flat shape. The first housing member 211 preferably includes an upper opening. The spindle motor 1 and the access unit 23 are preferably installed on the inner bottom surface of the first housing member 211. The second housing member 212 is preferably connected to the first housing member 211 so as to cover the upper opening of the first housing member 211. The disks 22, the access unit 23 and the spindle motor 1 are preferably accommodated within an internal space 213 of the apparatus housing 21 which is substantially surrounded by the first housing member 211 and the second housing member 212. The internal space 213 of the apparatus housing 21 is a clean space.

The disks 22 are preferably disk-shaped data storage media each having a central aperture. The disks 22 are preferably mounted to a hub 42 of the spindle motor 1 and arranged one above the other with a spacer 221 interposed therebetween. The access unit 23 preferably includes four heads 231 facing toward the upper and lower surfaces of the disks 22, arms 232 arranged to support the respective heads 231 and a swing mechanism 233 arranged to support the arms 232. The access unit 23 is preferably designed to swing the arms 232 across the disks 22 with the swing mechanism 233, thereby allowing the heads 231 to gain access to desired positions on the disks 22. Thus the heads 231 preferably perform the tasks of reading and writing information from and on the recording surfaces of the disks 22. It may be possible for the head 231 to perform only one of the reading and writing tasks.

Figure 2:
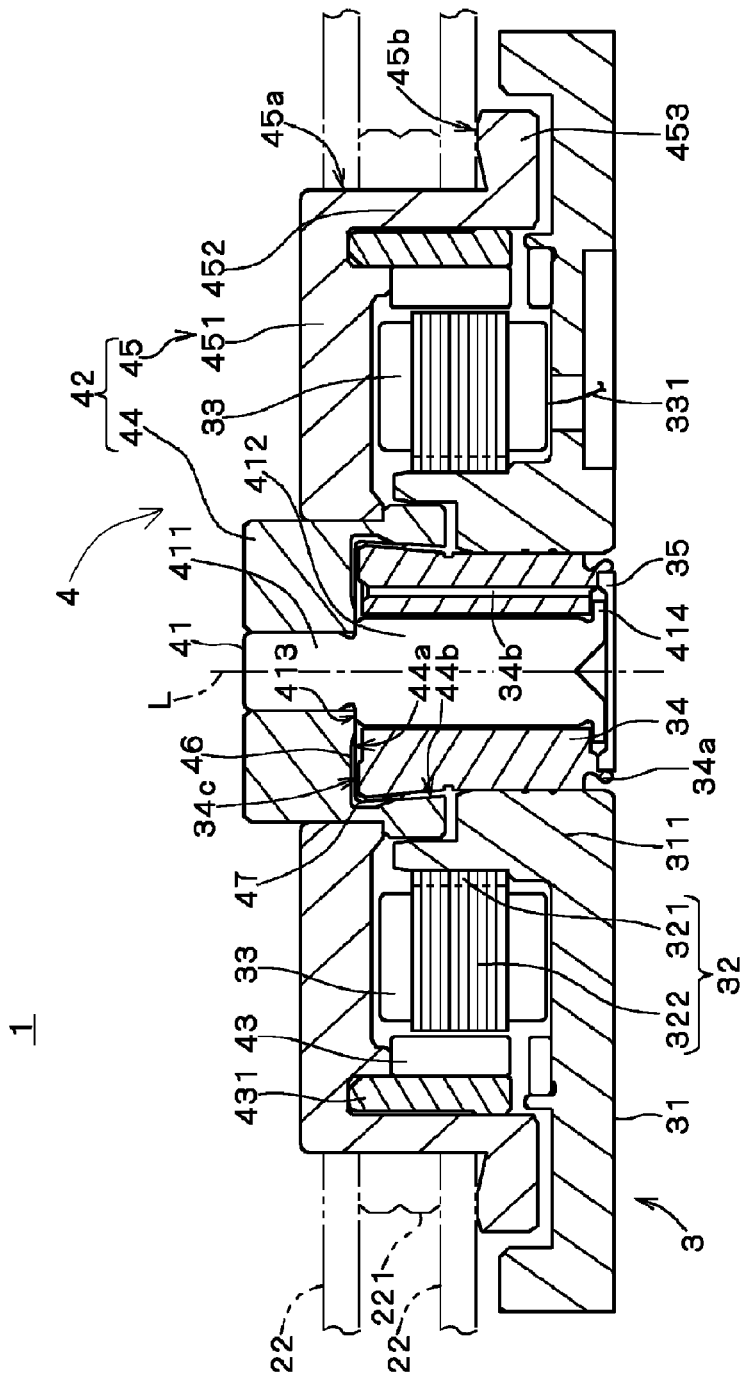
FIG. 2 is a sectional view showing a spindle motor, which view is taken along a plane containing the central axis.

Next, description will be made on the detailed configuration of the spindle motor 1. FIG. 2 is a sectional view showing the spindle motor 1, which view is taken along a plane containing the central axis. As shown in FIG. 2, the spindle motor 1 preferably includes the stator unit 3 fixed to the apparatus housing 21 of the disk drive apparatus 2 and the rotor unit 4 which holds the disks 22 and rotates about the central axis L.

The configuration of the stator unit 3 will be described first. The stator unit 3 preferably includes a base member 31, a stator core 32, a coil 33 and a sleeve 34.

The base member 31 is preferably made of a metallic material such as aluminum or the like and is fixed to the apparatus housing 21 of the disk drive apparatus 2. The base member 31 preferably includes a substantially cylindrical holder portion 311 protruding around the central axis L in the axial direction (in the direction extending along the central axis L, which definition holds true herein below). A through-hole is preferably arranged at the inner circumference side of the holder portion 311 (the inner circumference side with respect to the central axis L, which definition holds true herein below). The stator core 32 is preferably fixed to the outer circumference side of the holder portion 311 (the outer circumference side with respect to the central axis L, which definition holds true herein below).

Although the base member 31 and the first housing member 211 are preferably formed as separate members in the present preferred embodiment, the present invention is not limited thereto. Alternatively, the base member 31 and the first housing member 211 may be formed into a single member.

The stator core 32 includes an annular core-back 321 fixed to the outer circumferential surface of the holder portion 311 and a plurality of tooth portions 322 protruding radially outwardly (in the direction perpendicular to the central axis L, which definition holds true herein below) from the core-back 321. The stator core 32 is formed by, e.g., axially laminating electromagnetic steel plates.

The coil 33 is formed of a conductive wire wound around the respective tooth portions 322 of the stator core 32. The coil 33 is connected to a power source (not shown). If a driving current is supplied from the power source to the coil 33 through the lead line 331, radial magnetic flux is generated in the tooth portions 322. The magnetic flux generated in the tooth portions 322 interacts with the magnetic flux of a rotor magnet 43 to generate torque for rotating the rotor unit 4 about the central axis L.

The sleeve 34 is arranged at the outer circumference side of the shaft 41 and has a generally cylindrical inner circumferential surface for surrounding the shaft 41. The sleeve 34 is fixed to the inner circumferential surface of the holder portion 311 of the base member 31. On the lower surface of the sleeve 34, there is formed a projection portion 34a that protrudes downwards. A cap 35 for sealing an opening formed in the lower end portion of the sleeve 34 is fixed to the projection portion 34a.

A radial dynamic pressure bearing portion that allows the shaft 41 to rotate about the central axis L is formed between the outer circumferential surface of the shaft 41 and the inner circumferential surface of the sleeve 34. A lubricant 51 (see FIG. 5) is continuously filled in a small gap (of, e.g., several micrometers or so) between the inner circumferential surface of the sleeve 34 and the outer circumferential surface of the shaft 41, a small gap between the lower surface of the shaft 41 and the upper surface of the cap 35, a small gap between the upper surface of the sleeve 34 and the lower surface of the below-mentioned hub 42 and a circulation hole 34b axially formed in the sleeve 34. Oil mainly composed of ester, e.g., polyol ester-based oil or diester-based oil, is used as the lubricant 51.

Figure 3:
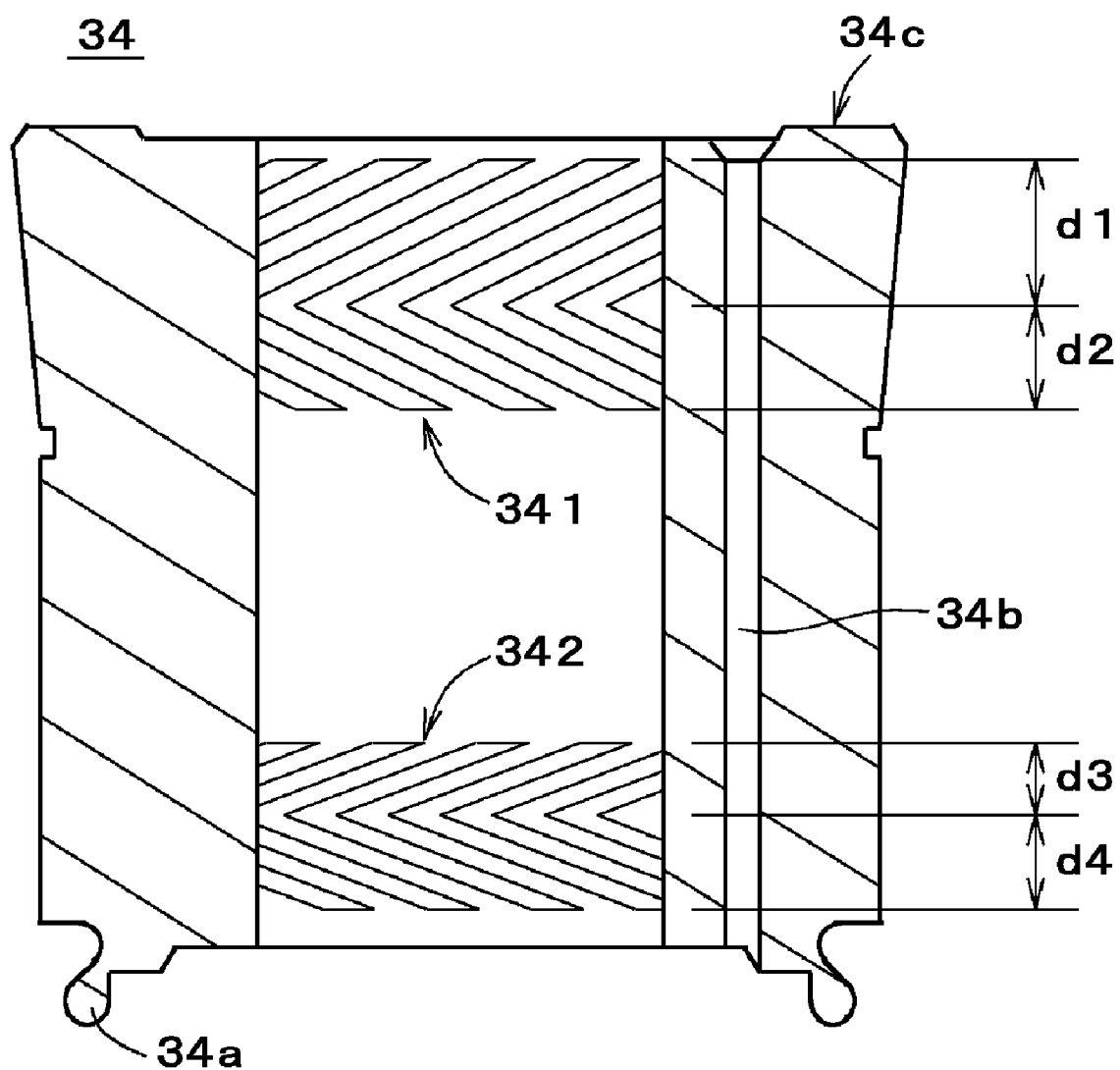
FIG. 3 is a sectional view showing a sleeve, which view is taken along a plane containing the central axis.

FIG. 3 is a sectional view showing the sleeve 34, which view is taken along a plane containing the central axis. As shown in FIG. 3, a first radial dynamic pressure groove array 341 and a second radial dynamic pressure groove array 342 both for generating a dynamic fluid pressure in the lubricant 51 existing between the outer circumferential surface of the shaft 41 and the inner circumferential surface of the sleeve 34 are formed on the inner circumferential surface of the sleeve 34. The first radial dynamic pressure groove array 341 and the second radial dynamic pressure groove array 342 are all formed of herringbone grooves.

As shown in FIG. 3, the dimension d1 between the curved transition points and the upper ends of the respective grooves of the first radial dynamic pressure groove array 341 is greater than the dimension d2 between the curved transition points and the lower ends thereof. Furthermore, the dimension d4 between the curved transition points and the lower ends of the respective grooves of the second radial dynamic pressure groove array 342 is greater than the dimension d3 between the curved transition points and the upper ends thereof. Therefore, the first and second radial dynamic pressure groove arrays 341 and 342 generate dynamic fluid pressures acting toward the axial center of the sleeve 34. The dimension d1 is greatest among the dimensions d1, d2, d3 and d4. The first and second radial dynamic pressure groove arrays 341 and 342 as a whole generate a downwardly acting dynamic fluid pressure in the lubricant 51.

When the shaft 41 is rotated relative to the sleeve 34, the lubricant 51 is pressurized by the first and second radial dynamic pressure groove arrays 341 and 342 as set forth above. Thus, the shaft 41 makes rotation while it is radially supported by the dynamic fluid pressure generated in the lubricant 51.

Although the first and second radial dynamic pressure groove arrays 341 and 342 are formed on the inner circumferential surface of the sleeve 34 in the present preferred embodiment, the present invention is not limited thereto. For example, the first and second radial dynamic pressure groove arrays may be provided on one of the inner circumferential surface of the sleeve and the outer circumferential surface of the shaft.

Figure 4:
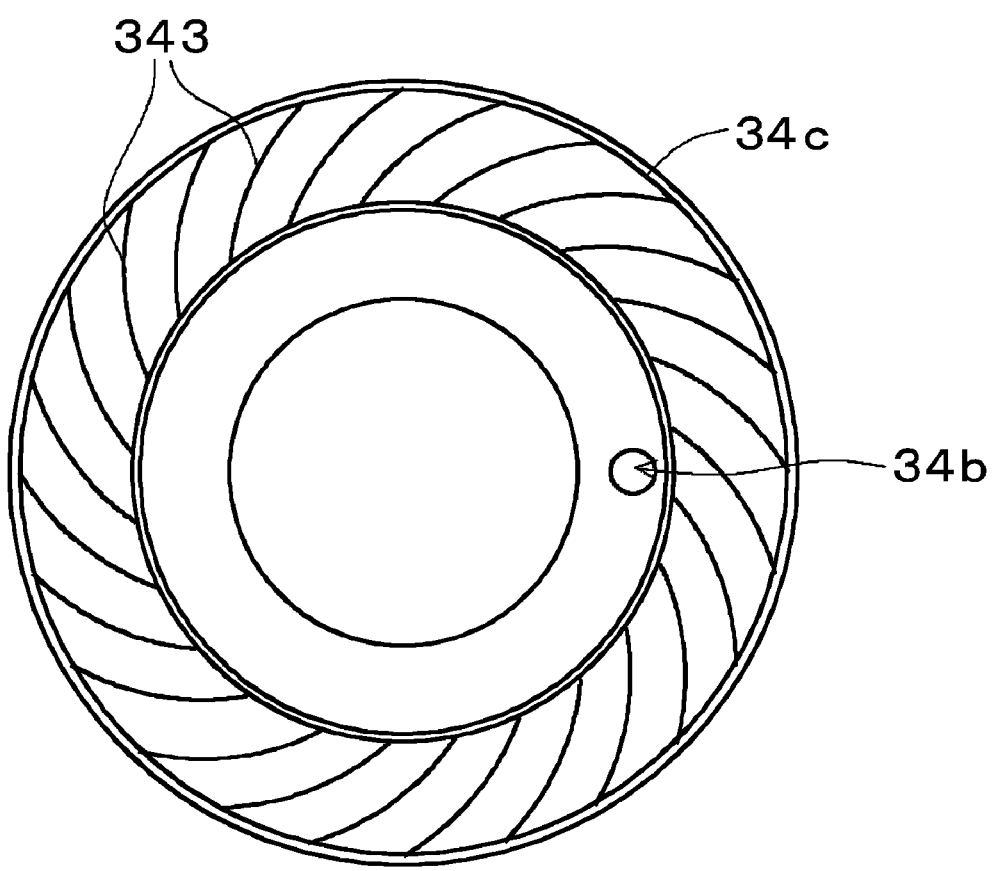
FIG. 4 is a top view showing the sleeve.

FIG. 4 is a plan view of the sleeve 34. In the outer edge portion of the upper surface of the sleeve 34, there is preferably provided a bearing surface 34c which comes closer to a lower surface 44a of a bush 44. The bearing surface 34c preferably includes a thrust dynamic pressure groove array 343 in order to generate a dynamic fluid pressure in the lubricant 51 provided between the lower surface 44a of the bush 44 and the upper surface of the sleeve 34. The thrust dynamic pressure groove array 343 preferably includes a plurality of spiral grooves arranged around the central axis L. When the shaft 41 and the hub 42 are rotated relative to the sleeve 34, the lubricant 51 is preferably pressurized by the thrust dynamic pressure groove array 343. Thus, the shaft 41 and the hub 42, while they rotate, are preferably supported in the axial direction by the dynamic fluid pressure generated in the lubricant 51.

As mentioned above, the sleeve 34 preferably supports the shaft 41 and the hub 42 in a manner so as to allow the shaft 41 and the hub 42 to rotate about the central axis L. The sleeve 34, the cap 35, the below-mentioned shaft 41 and the below-mentioned hub 42 preferably constitute a fluid dynamic pressure bearing 5 of the present invention.

The sleeve 34 is preferably made of a metallic material, e.g., magnetic or non-magnetic stainless steel, copper alloy or the like.

Although the sleeve 34 is constructed from a single member in the present preferred embodiment, it may be formed of two or more members. For example, the sleeve may include a sleeve body portion and a sleeve housing in order to accommodate therein the sleeve body portion.

Referring back to FIG. 2, description will be made on the configuration of the rotor unit 4. The rotor unit 4 preferably includes the shaft 41, the hub 42 and the rotor magnet 43.

The shaft 41 is a substantially columnar member arranged along the central axis L. The shaft 41 is preferably inserted into the bore of the sleeve 34 and supported by the sleeve 34 for rotation relative thereto. The shaft 41 preferably includes a head portion 411 which holds at its outer circumferential surface a bush 44 (described below), and a body portion 412 which is arranged inside the sleeve 34. The head portion 411 preferably includes a diameter relatively smaller than that of body portion 412.

A stepped surface 413 is preferably provided in the boundary portion between head portion 411 and the body portion 412 on the outer circumferential surface of the shaft 41. The stepped surface 413 preferably makes contact with the inner edge portion of the lower surface 44a of the bush 44, thereby restricting the axial position of the hub 42 relative to the shaft 41.

The shaft 41 preferably includes at the lower end portion thereof an annular flange portion 414 which holds the shaft 41 against removal from the sleeve 34. The flange portion 414 is preferably provided in the space defined between the lower surface of the sleeve 34 and the upper surface of the cap 35. When an upwardly acting force is imparted to the rotor unit 4, the upper surface of the flange portion 414 comes into contact with the lower surface of the sleeve 34. This preferably prevents the stator unit 3 and the rotor unit 4 from being separated from each other. Although the shaft 41 and the flange portion 414 are formed into a single member in the present preferred embodiment, the present invention is not limited thereto. For example, the shaft and the flange portion may be constructed from separate members.

The hub 42 is preferably fixed to and rotates with the shaft 41. The hub 42 preferably includes the bush 44 fixed to the head portion 411 of the shaft 41, and a hub body portion 45 fixed to the outer circumferential surface of the bush 44 and arranged to hold the disks 22 in place. It is to be appreciated that the annular member preferably designates the bush 44 in the present preferred embodiment.

Figure 5:
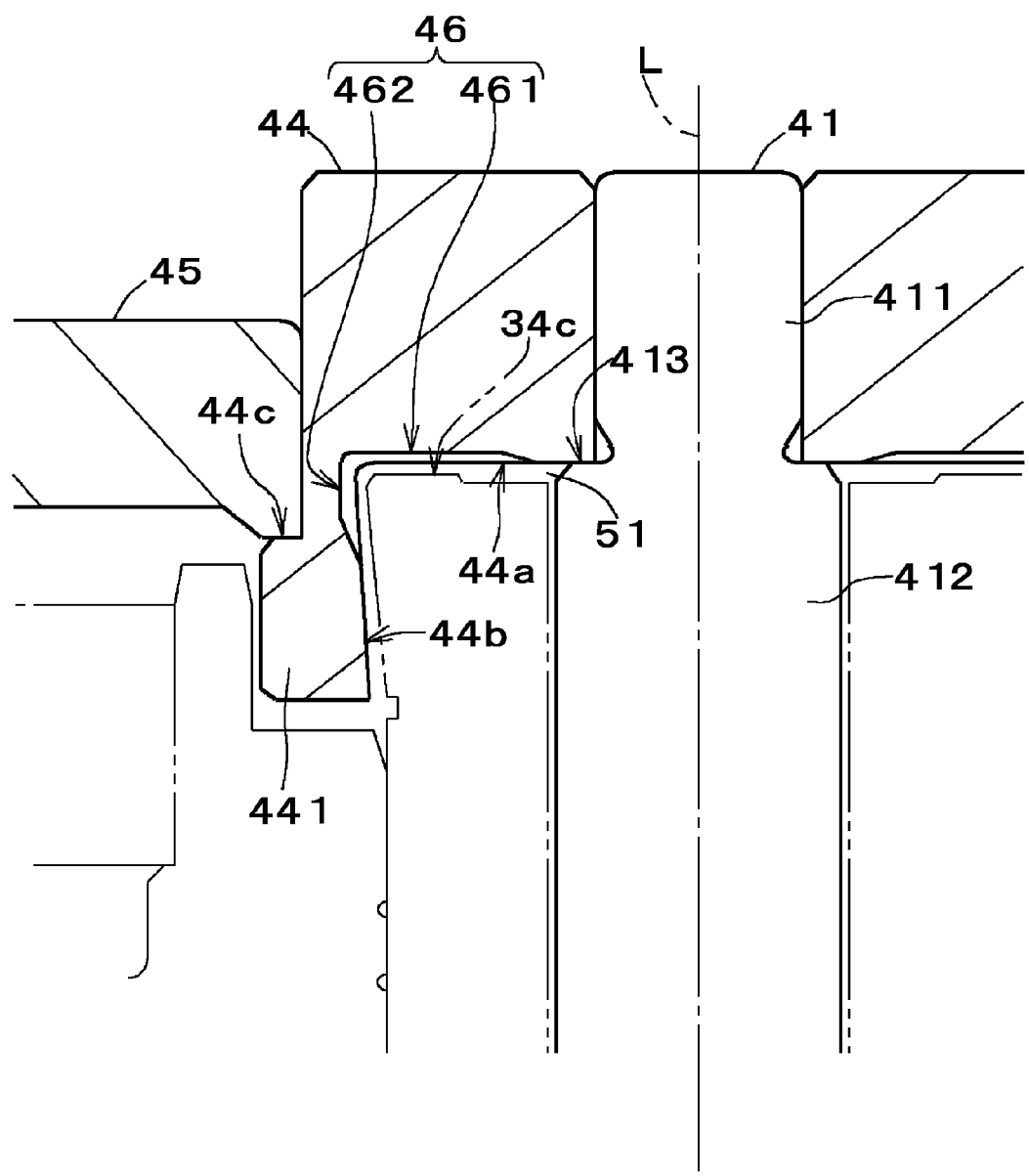
FIG. 5 is an enlarged sectional view including a bush, which view is taken along a plane containing the central axis.

FIG. 5 is an enlarged sectional view showing the bush 44 and elements adjacent thereto, which view is taken along a plane containing the central axis. As shown in FIG. 5, the bush 44 is preferably fixed to the shaft 41 in a state that the inner edge portion of the lower surface 44a of the bush 44 is brought into contact with the stepped surface 413 of the shaft 41. A thrust dynamic pressure bearing is preferably provided at the lower surface 44a of the bush 44, the bearing surface 34c arranged at the upper surface of the sleeve 34, and the lower surface 44a of the bush 44. The thrust dynamic pressure bearing preferably includes at the area described above the lubricant 51. The bush 44 preferably includes a cylinder portion 441 extending downwards from the outer edge portion of the lower surface 44a. The cylinder portion 441 preferably includes an inner circumferential surface 44b joining to the lower surface 44a of the bush 44 and facing the outer circumferential surface of the sleeve 34 through the lubricant 51. On the outer circumferential surface of the cylinder portion 441, there is provided a cylinder portion stepped surface 44c which hat makes contact with the inner edge portion of the lower surface of the hub body portion 45.

A recess portion 46 is preferably provided on the lower surface 44a of the bush 44 and the inner circumferential surface 44b of the cylinder portion 441 such that it extends over the lower surface 44a and the inner circumferential surface 44b. The recess portion 46 preferably includes a first recess portion 461 arranged on the lower surface 44a of the bush 44 and a second recess portion 462 arranged on the inner circumferential surface 44b of the cylinder portion 441. The recess portion 46 preferably constitutes at least a single groove having a substantially L-shape overall cross-section.

The first recess portion 461 preferably includes at least an area of the lower surface 44a facing the bearing surface 34c of the sleeve 34. Also, the first recess portion 461 is preferably provided on the lower surface 44a over an area excluding the portion that makes contact with the stepped surface 413 of the shaft 41. The second recess portion 462 is preferably provided on the inner circumferential surface 44b of the cylinder portion 441 over an area extending a predetermined width from the upper end of the inner circumferential surface 44b. The recess portion 46 is preferably provided on the lower surface 44a of the bush 44 and the inner circumferential surface 44b of the cylinder portion 441 to extend over the full circumference thereof around the central axis L.

A lubricating film 47 provided to enhance lubrication between the sleeve 34 and the bush 44 is preferably provided on the surface of the recess portion 46. The lubricating film 47 is preferably provided in the depressed area of the recess portion 46. This configuration ensures that the position of the lubricating film 47 is accurately defined on the bush 44. The lubricating film 47 is capable of assuring good sliding movement between the sleeve 34 and the bush 44 and protecting them from vibration or damage even when they would be brought into contact with each other by external shocks or other causes.

The lubricating film 47 is preferably made of a solid material such as a resin with high lubrication property. For example, the lubricating film 47 may be made of one or more of molybdenum sulfide, tungsten sulfide, graphite, boron nitride, antimony trioxide, polytetrafluoroethylene (PTFE), black lead, mica, talc, soap stone and Chinese white.

In the spindle motor 1 of the present preferred embodiment, the lubricating film 47 held in the first recess portion 461 and the second recess portion 462 is preferably provided on the lower surface 44a of the bush 44 over an area excluding the portion which makes contact with the stepped surface 413 of the shaft 41 as set forth above. This means that the lubricating film 47 does not exist between the lower surface 44a of the bush 44 and the stepped surface 413 of the shaft 41. Therefore, it is possible to avoid a problem that the accuracy in mounting the bush 44 to the shaft 41 would be reduced by the deformation of the lubricating film 47. It is also possible to prevent the hub 42 from being axially misaligned with the shaft 41. Moreover, it is possible to prevent the hub 42 from being attached to the shaft 41 in an inclined state.

In the present preferred embodiment, the lubricating film 47 held in the first recess portion 461 and the second recess portion 462 is preferably provided on the lower surface 44a of the bush 44 over an area including the portion that faces the bearing surface 34c of the sleeve 34. Therefore, it is possible to appropriately protect the bearing surface 34c, which constitutes the thrust dynamic pressure bearing, and the lower surface 44a of the bush 44, which faces the bearing surface 34c, from damage.

In the present preferred embodiment, the second recess portion 462 is preferably provided on the inner circumferential surface 44b of the cylinder portion 441. The coating area of the lubricating film 47 preferably extends over the inner circumferential surface 44b of the cylinder portion 441. This makes it possible to appropriately protect the inner circumferential surface 44b of the cylinder portion 441 and the outer circumferential surface of the sleeve 34 from damage, even in such an instance that the bush 44 is flexed by the weight of the disks 22, causing the inner circumferential surface 44b of the cylinder portion 441 to make contact with the outer circumferential surface of the sleeve 34.

Referring back to FIG. 2, the hub body portion 45 preferably includes a planar portion 451, a hub cylinder portion 452 and a hub flange portion 453. The planar portion 451 is preferably fixed to the outer circumferential surface of the bush 44 and extends radially outwards. The hub cylinder portion 452 preferably extends downwards from the outer edge portion of the planar portion 451. The hub flange portion 453 preferably extends radially outwards from the lower end portion of the hub cylinder portion 452.

The inner circumferential portions (inner circumferential surfaces or inner edges) of the disks 22 preferably make contact with the outer circumferential surface 45a of the hub cylinder portion 452. The disks 22 are placed on the upper surface 45b of the hub flange portion 453.

The disks 22 are preferably arranged one above the other on the upper surface 45b of the hub flange portion 453 in a horizontal posture. That is, the lower one of the disks 22 is preferably placed on the upper surface 45b of the hub flange portion 453, and the upper one of the disks 22 is preferably placed above the lower one with a spacer 221 interposed therebetween. The inner circumferential portions of the disks 22 preferably make contact with the outer circumferential surface 45a of the hub cylinder portion 452, whereby the disks 22 are secured against movement in the radial direction.

The disks 22 of the present preferred embodiment are made of aluminum. Also, the hub body portion 45 is preferably made of aluminum. Therefore, the disks 22 preferably include a linear expansion coefficient equal to or approximate to that of the hub body portion 45.

By virtue of such configuration, even when the ambient temperature or the internal temperature of the spindle motor 1 is changed, generation of unduly high stresses between the disks 22 and the hub body portion 45 is avoided. The bush 44 of the present preferred embodiment is made of stainless steel or other materials with increased hardness in order to keep the bush 44 firmly fixed to the shaft 41.

Although the hub 42 of the present preferred embodiment includes two members, i.e., the bush 44 and the hub body portion 45, the present invention is not limited thereto. Alternatively, the hub 42 may be formed into a single member. For example, if the disks are produced using glass as a main material, the hub may be formed into a single member using stainless steel or other materials whose linear expansion coefficient is approximate to that of the disks. In this case, the hub serves as the annular member.

The rotor magnet 43 is preferably attached to the lower surface of the hub body portion 45 through a yoke 431. The rotor magnet 43 preferably is annularly arranged around the central axis L. The rotor magnet 43 preferably includes an inner surface as a magnetic pole surface that faces the outer circumferential surface of the tooth portions 322 of the stator core 32.

In the spindle motor 1 described above, radial magnetic flux is generated in the tooth portions 322 of the stator core 32 if a driving current is applied to the coil 33 of the stator unit 3. Torque is preferably generated by the action of the magnetic flux between the tooth portions 322 and the rotor magnet 43, which causes the rotor unit 4 to rotate relative to the stator unit 3 about the central axis L. The disks 22 supported on the hub 42 are preferably rotated about the central axis L together with the shaft 41 and the hub 42.

Figure 6:
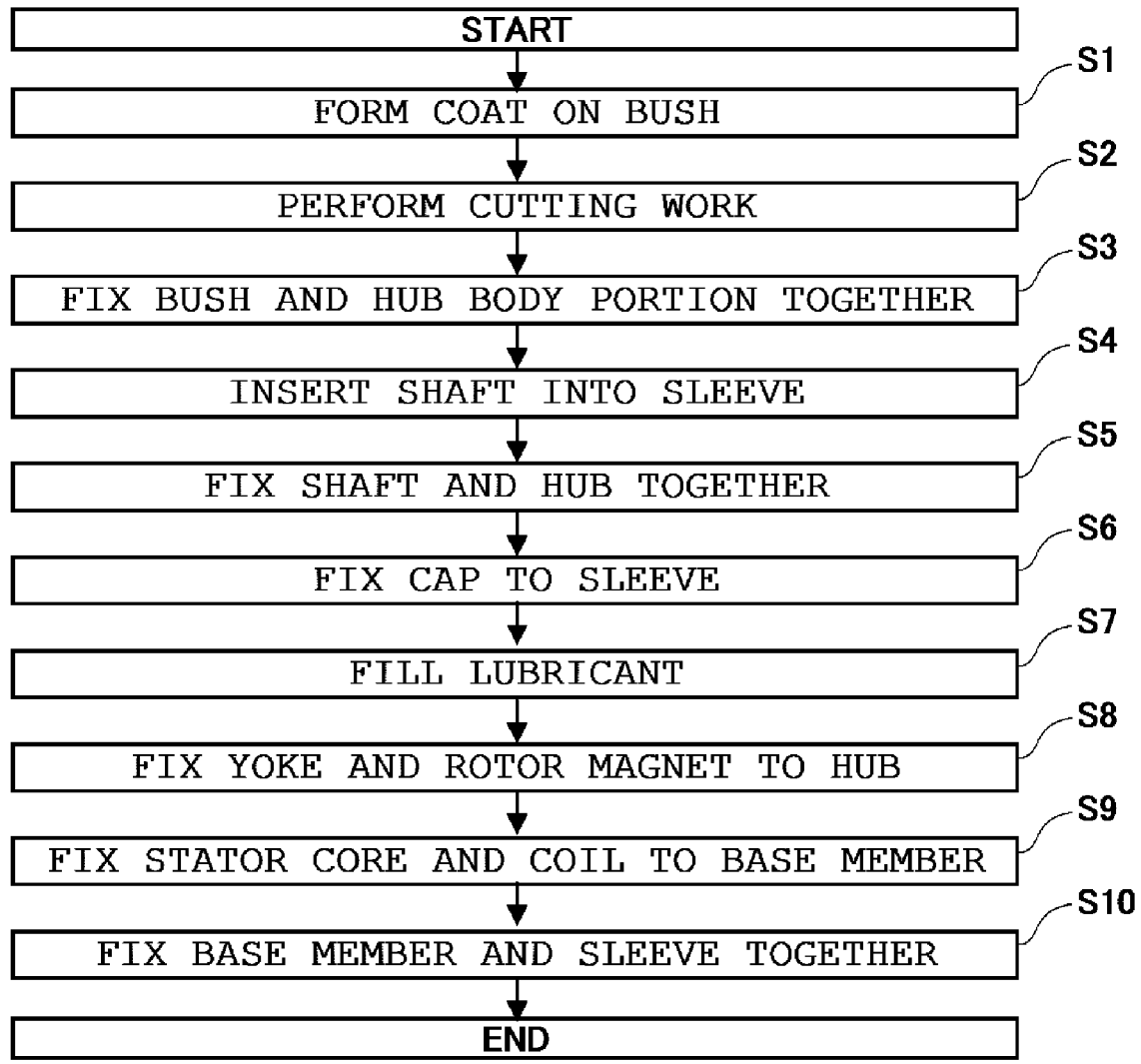
FIG. 6 is a flowchart illustrating the manufacturing sequence of the spindle motor.

Next, the manufacturing sequence of the spindle motor 1 will be described with reference to the flowchart shown in FIG. 6. The manufacturing sequence of the spindle motor 1 described below preferably includes the manufacturing sequence of the fluid dynamic pressure bearing 5 which is a part of the spindle motor 1.

In the manufacture of the spindle motor 1, the bush 44 on which the lubricating film 47 is not yet provided is prepared first. The recess portion 46 is preferably provided in advance at the lower surface 44a of the bush 44 over the area which is to be coated with the lubricating film 47. Note that the area around the recess portion 46 of the lower surface 44a of the bush 44 and the inner circumferential surface 44b of the cylinder portion 441 are in a raised state (i.e., pre-cutting state) compared with a post-manufacturing state.

Figure 7:
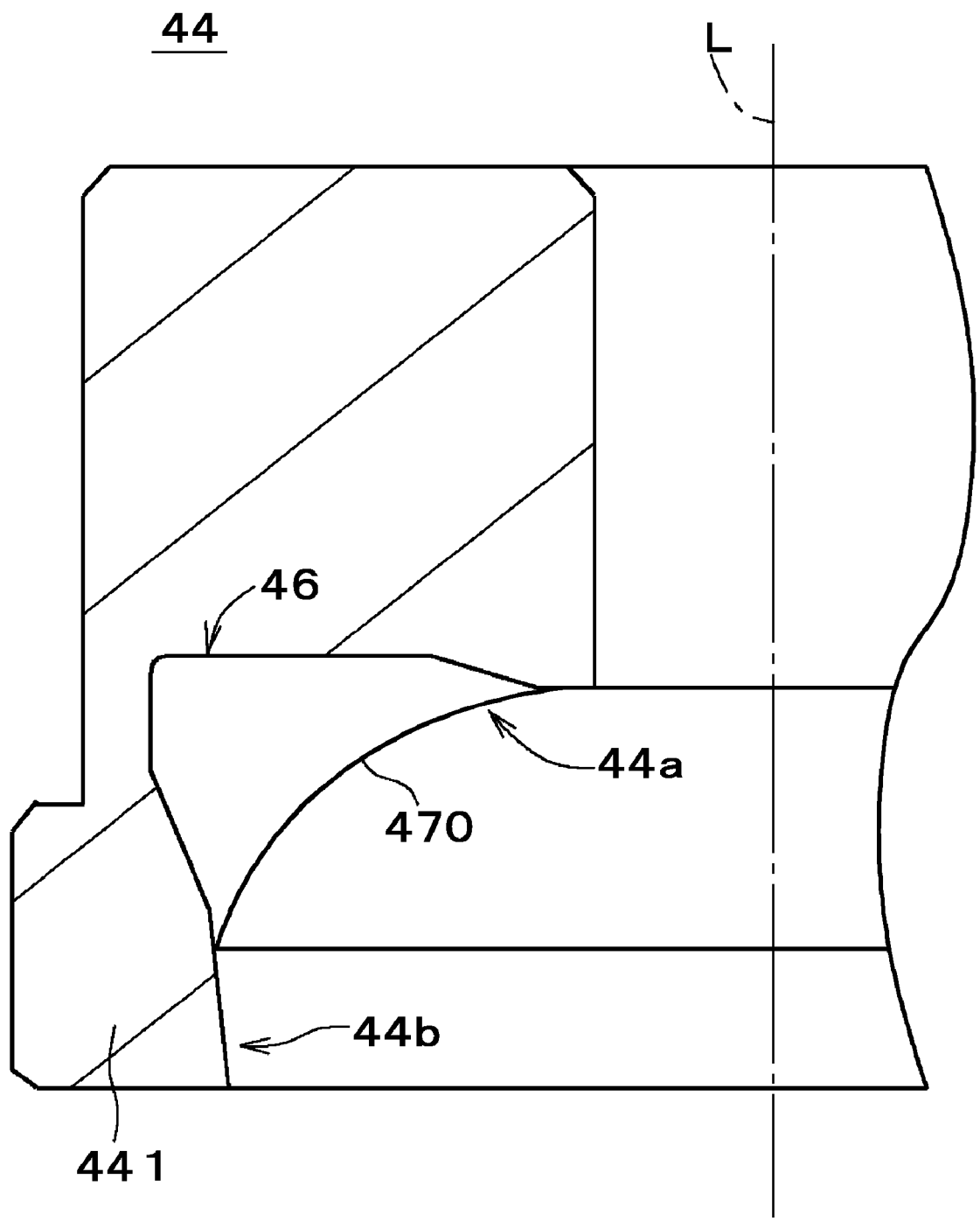
FIG. 7 is a sectional view showing a state that a coating as a prototype of a lubricating film is provided on the bush, which view is taken along a plane containing the central axis.

Once the bush 44 is prepared for a next step, the coating 470 as a prototype of the lubricating film 47 is preferably provided on the lower surface 44a of the bush 44 and the inner circumferential surface 44b of the cylinder portion 441 (Step S1). More specifically, as shown in FIG. 7, a material of which the lubricating film 47 is made is continuously attached to the recess portion 46 and corresponding area on the lower surface 44a of the bush 44 and the inner circumferential surface 44b of the cylinder portion 441 by application, spray, transfer or other methods.

Figure 8:
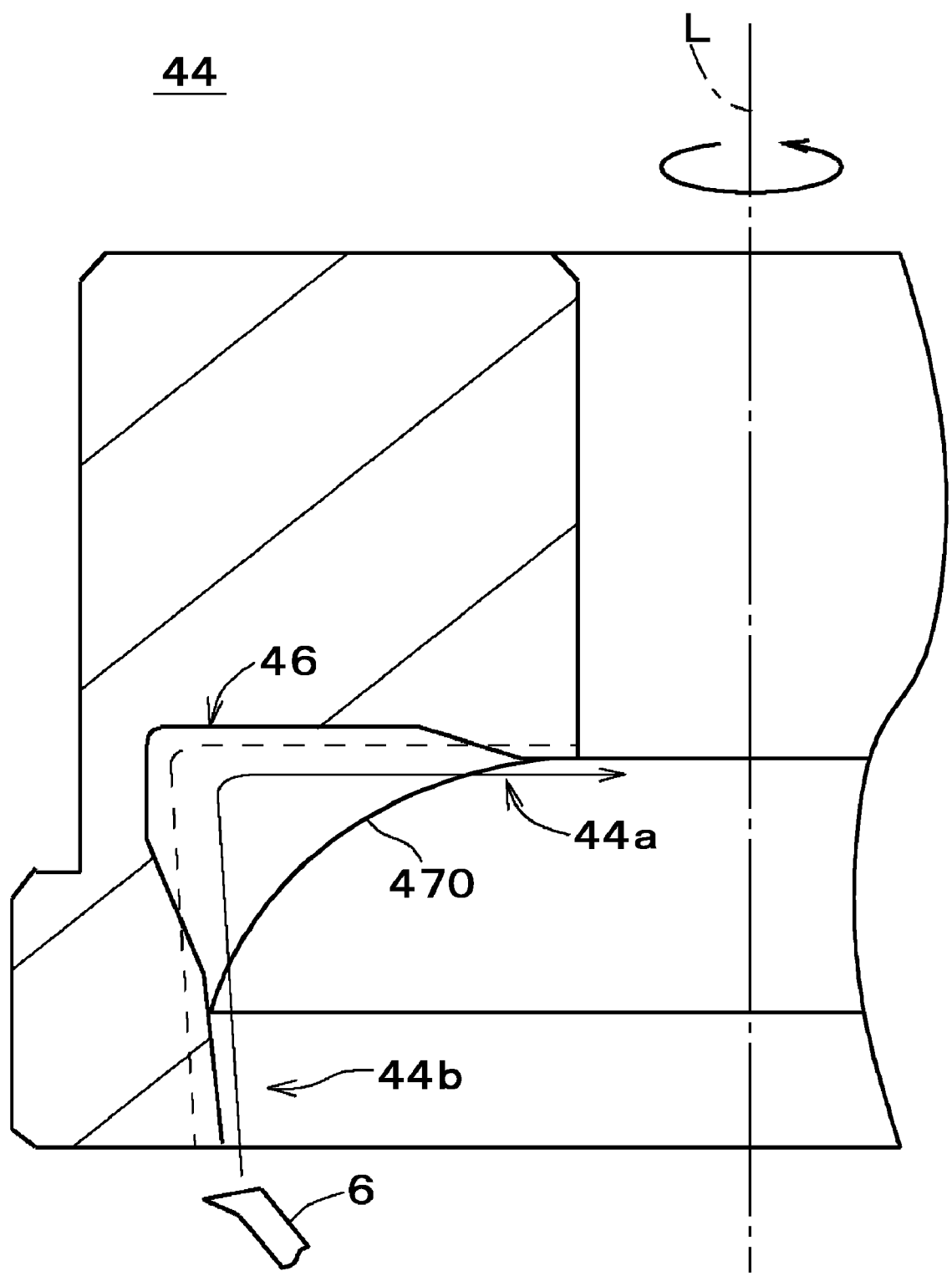
FIG. 8 is a sectional view showing a state that a cutting work is performed on the bush, which view is taken along a plane containing the central axis.

After the coating 470 is provided, a cutting work is preferably performed on the lower surface 44a of the bush 44 and the inner circumferential surface 44b of the cylinder portion 441 (step S2). More specifically, the bush 44 is first held by a chuck mechanism (not shown). Then, the chuck mechanism is rotated so as to rotate the bush 44 about the central axis L. As shown in FIG. 8, the inner circumferential surface 44b of the cylinder portion 441 and the lower surface 44a of the bush 44 are cut by causing a cutting tool 6 to advance along a target surface contour (indicated by a broken line in FIG. 8) while rotating the bush 44.

During this cutting work, the metallic material of the bush 44 and the coating 470 are cut continuously as illustrated in FIG. 8. Through this cutting work, an exposed metal surface 44d at which the metallic material of the bush 44 is preferably exposed and a lubricating film 47 which is provided by cutting the surface of the coating 470 are provided on the lower surface 44a of the bush 44 and the inner circumferential surface 44b of the cylinder portion 441 as shown in FIG. 9.

In the present preferred embodiment, the exposed metal surface 44d and the lubricating film 47 are preferably provided by forming the coating 470 as a prototype of the lubricating film 47 on the recess portion 46 and its adjacent area of the bush 44 and then continuously cutting the bush 44 and the coating 470 as mentioned above. This makes it possible to effectively and easily provide the lubricating film 47 on the lower surface 44a of the bush 44 over an area excluding the portion which makes contact with the stepped surface 413 of the shaft 41.

Figure 9:
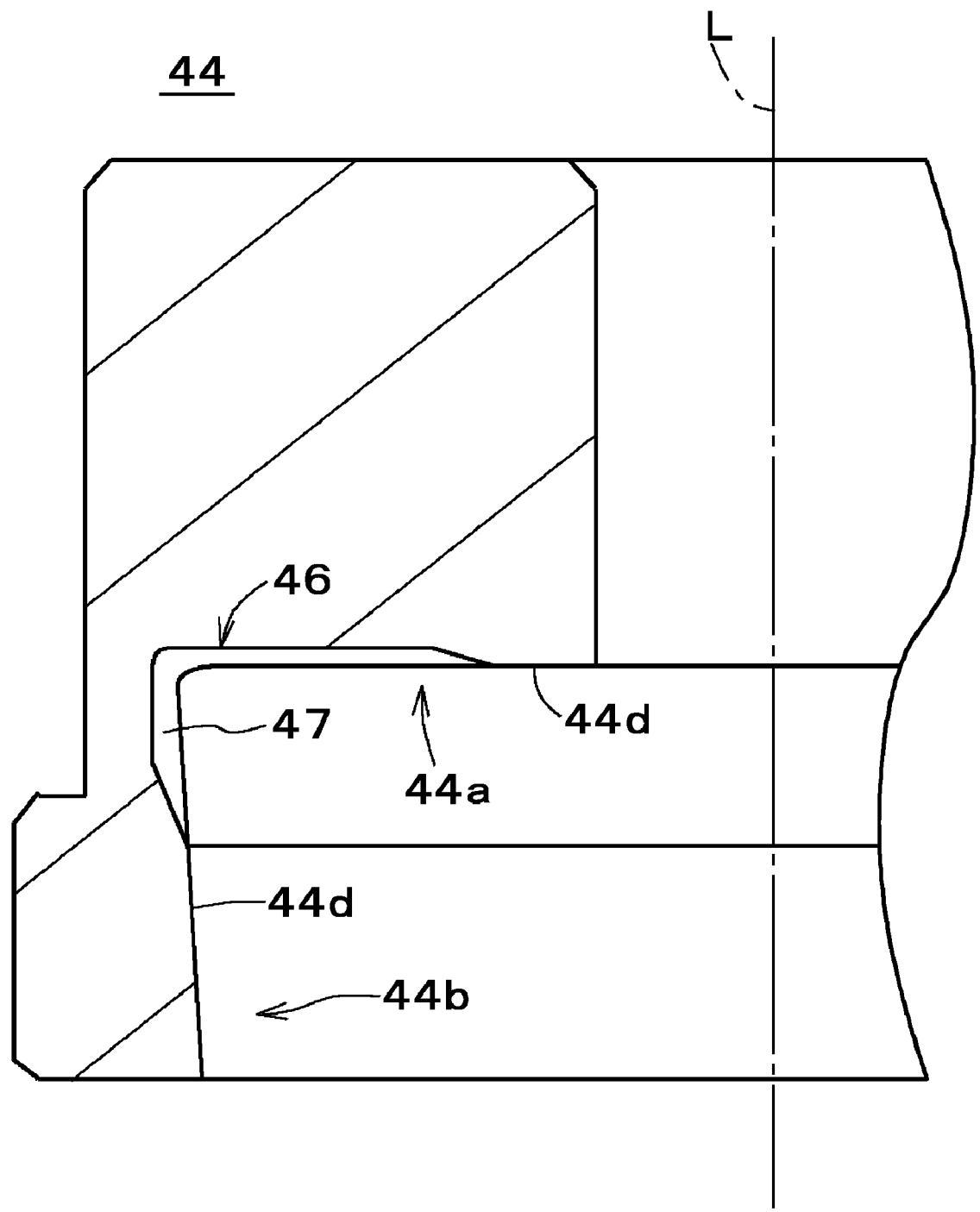
FIG. 9 is a sectional view showing the bush that has undergone the cutting work, which view is taken along a plane containing the central axis.
Figure 10:
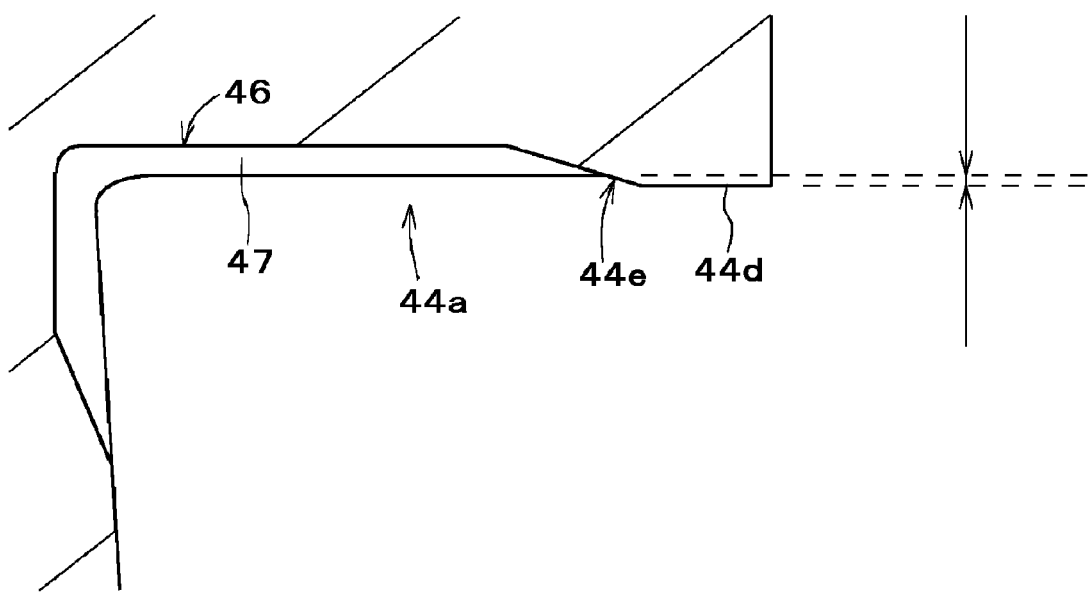
FIG. 10 is an enlarged sectional view showing the bush that has undergone the cutting work, which view is taken along a plane containing the central axis.

In FIG. 9, the surface of the lubricating film 47 and the exposed metal surface 44d are preferably depicted as though they are smoothly joined to each other in their boundary area. Strictly speaking, however, the exposed metal surface 44d is preferably provided slightly lower than the surface of the lubricating film 47 on the lower surface 44a of the bush 44 which has undergone the cutting work, as can be seen in FIG. 10 which is an enlarged partial sectional view of the bush taken along a plane containing the central axis. A stepped portion 44e is preferably provided in the boundary area between the surface of the lubricating film 47 and the exposed metal surface 44d.

The stepped portion 44e is preferably provided by continuously cutting the coating 470 having a relatively low cutting resistance and the metallic material having a relatively high cutting resistance. The direction of movement of the cutting tool 6 is not limited to the one shown in FIG. 8. If the cutting tool 6 is moved in the direction opposite from that shown in FIG. 8, the same stepped portion as the stepped portion 44e is provided in the boundary area between the lubricating film 47 and the exposed metal surface 44d on the inner circumferential surface 44b of the cylinder portion 441 of the bush 44.

Next, the hub 42 is produced by fixing the hub body portion 45 to the bush 44 which has gone through the above-mentioned step (step S3). In this regard, the hub body portion 45 is fixed to the bush 44 by, e.g., shrink fit or press fit.

Subsequent to or in parallel with the series of steps mentioned above, the shaft 41 is preferably inserted into the sleeve 34 (step S4). The shaft 41 is preferably inserted through the lower opening of the sleeve 34. When the insertion operation comes to an end, the head portion 411 of the shaft 41 preferably protrudes beyond the upper opening of the sleeve 34.

Thereafter, the shaft 41 inserted into the sleeve 34 in step S4 and the hub 42 obtained in step S3 are preferably fixed together (step S5). More specifically, the bush 44 of the hub 42 is preferably fixed to the head portion 411 of the shaft 41 by press fit, or the like. During the press fit, the exposed metal surface 44d provided at the inner edge portion of the lower surface 44a of the bush 44 is preferably brought into contact with the stepped surface 413 of the shaft 41, thereby restricting the axial position of the hub 42 relative to the shaft 41. The method of fixing the shaft 41 and the hub 42 together is not limited to the press fit. It may be possible to use other fixing methods such as adhesive bonding, shrink fit or the like.

Next, the cap 35 is attached to the lower end portion of the sleeve 34 into which the shaft 41 is inserted (step S6). The cap 35 is preferably fixed to the projection portion 34a provided in the lower end portion of the sleeve 34 by, for example, welding, bonding or caulking. The lower opening of the sleeve 34 is closed by attaching the cap 35 to the lower end portion of the sleeve 34.

Once the cap 35 is attached to the lower end portion of the sleeve 34, the lubricant 51 is preferably filled (step S7). More specifically, the assembly including the sleeve 34, the cap 35, the shaft 41 and the hub 42 obtained in the preceding steps is preferably first accommodated within a chamber and then the interior of the chamber is depressurized. The lubricant 51 is preferably provided through the gap between the outer circumferential surface of the sleeve 34 and the inner circumferential surface 44b of the cylinder portion 441 of the bush 44. Thereafter, the lubricant 51 is preferably spread along the gaps within the assembly by restoring the interior of the chamber to a normal pressure.

The lubricant 51 is continuously filled in the small gap between the inner circumferential surface of the sleeve 34 and the outer circumferential surface of the shaft 41, the small gap between the lower surface of the shaft 41 and the upper surface of the cap 35, the small gap between the upper surface of the sleeve 34 and the lower surface of the bush 44, and the circulation hole 34b axially provided in the sleeve 34.

The yoke 431 and the rotor magnet 43 are preferably fixed to the lower surface of the hub body portion 45 (step S8). More specifically, the yoke 431 is preferably fixed via an adhesive to the lower surface of the planar portion 451 of the hub body portion 45, and the rotor magnet 43 is fixed, via an adhesive, to the inner circumferential surface of the yoke 431.

In the stator unit 3, the stator core 32 and the coil 33 are fixed to the base member 31 (step S9). More specifically, the base member 31 and the stator core 32 are preferably fixed to each other by press-fitting the core-back 321 of the stator core 32 to the outer circumferential surface of the head portion 311 of the base member 31. The lead line 331 extending from the coil 33 is preferably connected to a specified power supply device.

Subsequently, the base member 31 and the sleeve 34 are preferably fixed to each other by press-fitting the sleeve 34 to the head portion 311 of the base member 31 (step S10). The spindle motor 1 is finished through the steps set forth above.

While one preferred embodiments of the invention have been described hereinabove, the present invention is not limited thereto. Many changes and modifications may be made without departing from the scope of the invention.

For example, although the coating 470 as a prototype of the lubricating film 47 is preferably provided only on the recess portion 46 and its adjacent area in step S1, the present invention is not limited thereto. The lubricating film may be provided on a broader region. That is, in step S1 performed prior to the cutting work, the coating 470 may be provided over a region covering at least the recess portion 46. For example, the coating may be provided in the whole region of the lower surface of the bush as the annular member and the inner circumferential surface of the cylinder portion.

Although the spindle motor 1 described above is a so-called shaft-rotating motor in which the shaft 41 is rotated together with the hub 42, the present invention is not limited thereto. The present invention may be applicable to, e.g., a shaft-fixed dynamic fluid pressure bearing, a shaft-fixed spindle motor and a shaft-fixed disk drive apparatus.

Figure 11:
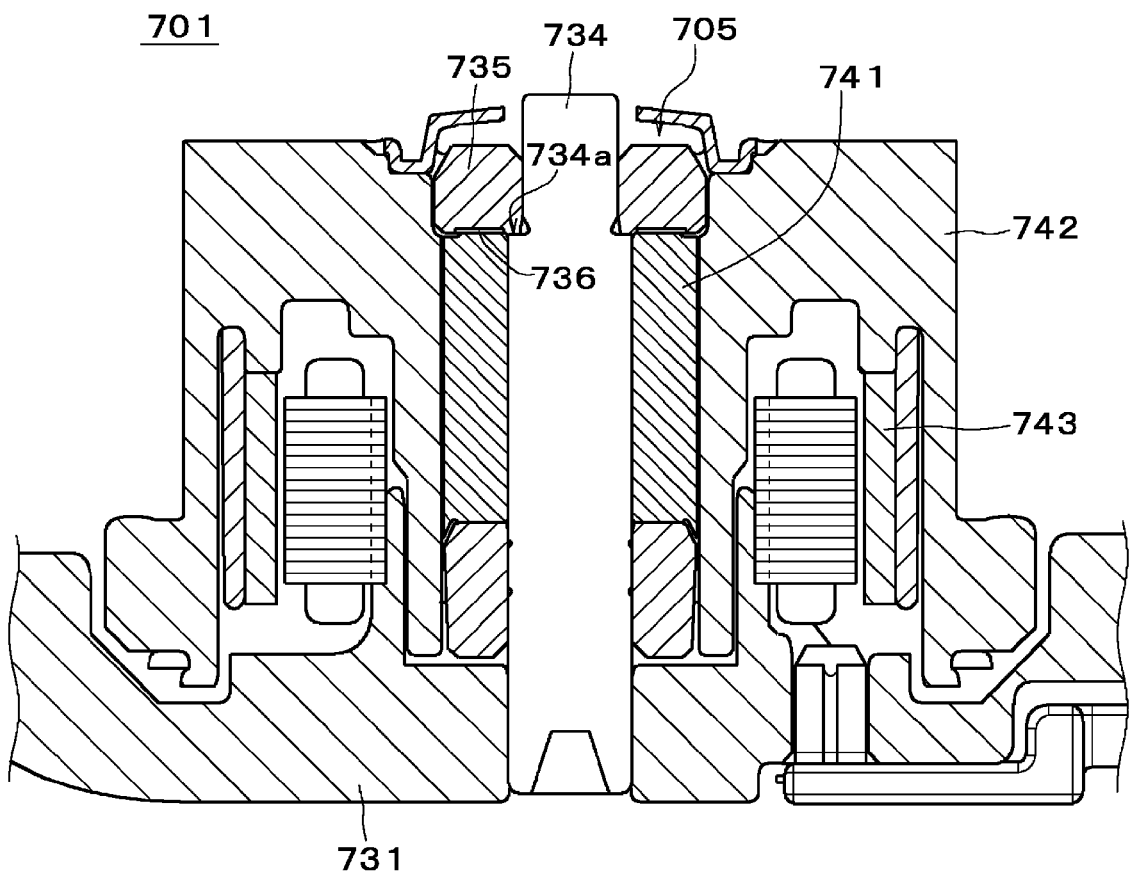
FIG. 11 is a sectional view showing a spindle motor in accordance with a modified embodiment, which view is taken along a plane containing the central axis.

FIG. 11 is a sectional view showing a shaft-fixed spindle motor, which view is taken along a plane containing the central axis. With the spindle motor 701 shown in FIG. 11, a sleeve 741, a hub 742 and a rotor magnet 743 are preferably rotated as a unit about a shaft 734 fixed relative to a base member 731. A thrust washer 735 as an annular member is fixed to the outer circumferential surface of the shaft 734. The shaft 734, the thrust washer 735 and the sleeve 741 comprise a fluid dynamic pressure bearing 705.

In the shaft-fixed spindle motor 701, a lubricating film 736 is preferably provided on the lower surface of the thrust washer 735. The lubricating film 736 is preferably provided on the lower surface of the thrust washer 735 over a region excluding the portion which makes contact with a stepped surface 734a of the shaft 734. By doing so, it is possible to prevent misalignment in the axial position of the thrust washer 735 with respect to the shaft 734 and inclination of the thrust washer 735.

Although the thrust dynamic pressure groove array 343 is provided on the upper surface of the sleeve 34 or 741 in the foregoing preferred embodiments, the present invention is not limited thereto. For example, the thrust dynamic pressure groove array may be provided on the lower surface of the bush or the lower surface of the thrust washer. In this case, it may be possible to form a lubricating film on the lower surface of the bush or the lower surface of the thrust washer after forming the thrust dynamic pressure groove array. Alternatively, the thrust dynamic pressure groove array may be provided on the surface of the lubricating film after forming the lubricating film on the lower surface of the bush or the lower surface of the thrust washer.

Although the sleeve 34 or 741 of the foregoing preferred embodiments is made of a metallic material (a soluble material) such as stainless steel or copper alloy, the present invention is not limited thereto. For example, the sleeve may be formed of a porous sintered body obtained by bonding and solidifying metallic powder while heating the same. This ensures that the interior of the sleeve is impregnated with a lubricant, which allows the shaft and the hub to make smoother sliding movement relative to the sleeve. The sleeve formed of the porous sintered body is obtainable at a relatively low price. As a further alternative, the sleeve may be made of various kinds of resin materials.

Although the disk drive apparatus 2 as a hard disk drive and the spindle motor 1 mounted thereto have been described in the foregoing preferred embodiment, the present invention is not limited thereto. For example, the present invention may be applicable to other disk drive apparatuses such as an optical disk drive and the like, spindle motors and dynamic fluid pressure bearings mounted thereto. In addition, lubricants other than oil, e.g., gases, may be used in the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fluid dynamic pressure bearing comprising:
   a shaft arranged along a central axis, the shaft including a stepped surface arranged on an outer circumferential portion thereof;
   an annular member fixed to the shaft, the annular member including a lower surface extending radially with respect to the central axis, the lower surface including an inner edge portion arranged to make contact with the stepped surface;
   a sleeve including an upper surface axially opposed to the lower surface of the annular member;
   a lubricant arranged between the shaft and the sleeve and between the annular member and the sleeve; and
   a lubricating film on the lower surface of the annular member at least over a region extending radially outwardly of the inner edge portion of the lower surface; wherein
   the lower surface of the annular member includes an exposed metal surface arranged to make contact with the stepped surface.

2. The fluid dynamic pressure bearing of claim 1, wherein
   a bearing surface is arranged on the upper surface of the sleeve, the bearing surface including a thrust dynamic pressure groove array arranged to generate a dynamic fluid pressure in a lubricant arranged between the upper surface of the sleeve and the lower surface of the annular member; and
   the lubricating film is arranged on the lower surface of the annular member at least over a region axially opposed to the bearing surface of the sleeve.

3. The fluid dynamic pressure bearing of claim 1, wherein
   the annular member includes a cylinder portion including an inner circumferential surface arranged to extend downwards from the lower surface of the annular member; and
   the lubricating film is continuously provided on the inner circumferential surface of the cylinder portion and the lower surface of the annular member.

4. The fluid dynamic pressure bearing of claim 3, wherein
   the inner circumferential surface of the cylinder portion includes a second recess portion extending radially outward; and
   the lubricating film is provided in the second recess portion.

5. The fluid dynamic pressure bearing of claim 1, wherein
   the lower surface of the annular member includes a first recess portion positioned above the exposed metal surface; and
   the lubricating film is provided in the first recess portion.

6. The fluid dynamic pressure bearing of claim 5, wherein the exposed metal surface is arranged below the lubricating film.

7. The fluid dynamic pressure bearing of claim 5, wherein the lower surface of the annular member includes a stepped portion arranged to interconnect the exposed metal surface and the first recess portion.

8. The fluid dynamic pressure bearing of claim 5, wherein
   the annular member includes a cylinder portion having an inner circumferential surface arranged to extend downwards from the lower surface of the annular member;
   the inner circumferential surface of the cylinder portion includes a second recess portion extending radially;
   the second recess portion is continuous with the first recess portion; and the lubricating film is provided in the first recess portion and the second recess portion.

9. The fluid dynamic pressure bearing of claim 1, wherein the lubricating film is provided on the lower surface of the annular member over an entire region extending radially outward of the inner edge portion of the lower surface of the annular member.

10. The fluid dynamic pressure bearing of claim 1, wherein the shaft includes a body portion having an outer circumferential surface radially opposed to the inner circumferential surface of the sleeve, and a head portion having an outer circumferential surface whose diameter is smaller than that of the outer circumferential surface of the body portion; and
the stepped surface of the shaft is provided in a boundary region between the body portion and the head portion.

11. A spindle motor comprising:
a stator unit;
a rotor unit rotatably supported by the stator unit via the fluid dynamic pressure bearing of claim 1; and
a torque generating portion arranged to generate torque to rotate the rotor unit relative to the stator unit about the central axis.

12. A disk drive apparatus arranged to at least one of read and write information while rotating a disk, the apparatus comprising:
the spindle motor of claim 11 arranged to rotate the disk;
an access unit arranged to at least one of read and write information from and on the disk, respectively; and
a housing arranged to accommodate therein the spindle motor and the access unit.

* * * * *